United States Patent Office 2,715,619
Patented Aug. 16, 1955

2,715,619

PROCESS FOR MANUFACTURING ALKYLATED METHYLOL MELAMINES

Tzeng-Jiueq Suen, Stamford, Conn., assignor to American Cyanamid Company, New York, N. Y., a corporation of Maine No Drawing. Application August 14, 1952,
Serial No. 304,430

6 Claims. (Cl. 260—67.6)

This invention relates to the production of water-soluble alklated methyol melamines.

The manufacture of water-soluble alkylated methylol melamines has been described in numerous references. The usual method for manufacturing such products is to react melamine with aqueous formaldehyde to form a polymethylol melamine, remove the bulk of the water from the polymethylol melamine and thereafter react the polymethylol melamine with an alcohol under acid conditions to form an alkylated methylol melamine. Such is the process described in U. S. Patent 2,529,856 amongst others. In the prior art processes, the removal of water in an intermediate step is essential because the etherification is a reversible reaction. If the major amount of water is not removed in the prior art process, a tremendous excess of alcohol is required to obtain the desired degree of alkylation. If the major amount of water is not removed and a reasonable quantity of alcohol is employed the final degree of alkylation would be too low to yield a practical product. Obviously the drying operation, that is the removal of water, should be carried out under very mild conditions in order to prevent further polymerization of the polymethylol melamine. The drying operation is therefore expensive, time consuming and inconvenient.

It is the primary object of this invention to provide a new and improved process for the production of alkylated methylol melamines in which process the intermediate drying step is not necessary.

The present process comprises the following steps: (A) reaction of melamine with formaldehyde in a mixture containing controlled amounts of etherifying alcohol and water under alkaline conditions, (B) alkylation under acid conditions, with additional alcohol, if necessary, and (C) concentration of the neutralized syrup to remove the excess and unreacted alcohol.

Since step (A) is the most critical to control of the three steps, it will be discussed in full detail hereinbelow.

Step (A) differs from the prior art by virtue of the fact that part of the water normally used is replaced by a controlled amount of etherifying alcohol. In this manner the necessity for removing water intermediate to steps (A) and (B) is eliminated because the amount of water present is not sufficient to affect seriously the alkylation reaction in step (B). The mere elimination of part of the water without replacing it with etherifying alcohol is not satisfactory because the mixture is not mechanically workable. The success of the new step (A) reaction is furthermore dependent on certain critical features.

In step (B) which is the alkylation step, it is desired to conduct the reaction under acid conditions such as at a pH of about 2–6.9 and preferably at a pH of about 4–6.6. To accomplish this, it is necessary to make use of some suitable, conventional acid catalyst many of which are known in the art. Representative of this group of acid catalysts are such materials as oxalic acid, hydrochloric acid, formic acid, stannic chloride, phosphoric acid, pyrophosphoric acid, nitric acid, phthalic acid, maleic acid, and the like.

The temperature at which the step (B) is carried out can be varied from room temperature (about 25° C.) to reflux but because of the economics of the operation, it is preferred that the reaction be carried out at reflux temperatures. The second step is permitted to continue until there is substantially equilibrium conditions existing in the sphere of reaction. The syrup is then neutralized to stablize the same.

The third step, namely step (C), is not an imperative step because if one desired a resin solution of a given solid concentration, one may not need to concentrate the solution produced at the completion of step (B); in fact, one may even desire to dilute that solution by adding additional water. If it is desired, however, to produce a solution of high solids content, one could concentrate the solution by distillation and preferably by vacuum distillation so as to avoid further polymerization. The concentration step (C) may be continued until substantially all of the unreacted alcohol and free water is removed or to any intermediate degree of concentration.

The most critical part of the reaction is the relative proportions of the formaldehyde, alcohol, and water. In the first step, the mol ratio of alcohol to water to be introduced into the sphere of reaction should be between about 5:1 to about 0.5:1 and preferably between about 2:1 and 1:1. After the first step has been completed and it is desired to add additional alcohol, one should add that amount which will be sufficient to bring the mol ratio of the total amount of alcohol charged to the total amount of water charged to at least about 2:1 to 10:1 and preferably to about 3:1 to 10:1. The molar ratio of alcohol to formaldehyde should be within the range of 0.4:1 to 5:1 and preferably within the range of 0.5:1 to 1:1, in step (A).

The criticalness of these ratios is believed to arise mainly from the following reasons: (1) the rate of reaction between melamine and formaldehyde increases with increasing amount of water in the mixture and decreases with increasing amount of alcohol in the solution; (2) the subsequent alkylation reaction is reversible in nature, and (3) melamine, as such, is of only very limited solubility in the formaldehyde-alcohol-water mixture. Advantageously, the amount of water used should be no higher than the minimum. However, due to the low solubility of melamine there must be enough liquid present at the beginning of reaction, otherwise the reaction mixture would not be mechanically workable. Consequently in the initial reaction mixture, the amount of water and alcohol must be so balanced that the reaction can proceed with a reasonable speed but further reaction leading to polymerization is minimized.

Other limitations in step (A) are few and less critical in nature. The preferred operating range of pH is from 7.0 to 12.0 although the preferred pH range is from 7.5 to 10.5, the rate of reaction greater at the lower end of the pH range. Buffers, such as sodium carbonate, sodium acid phosphate, sodium hydroxide, sodium formate, triethanolamine, and the like may be used, if desired, to maintain the preferred pH range. The temperature at which the reaction is carried out may range from a low of about 50° C. up to reflux point of the reaction mixture. Reflux temperature is generally the most convenient temperature to employ.

The time of reaction is of course dependent upon all of the factors previously mentioned but in general the time will be in the range of a few minutes to several hours. The actual time to be employed in each instance will be within the skill of a routineer in the art and will be controlled by the fact that the reaction should be stopped before the final product reaches the hydrophobe point.

The alcohol may be added initially in full amount or part of the alcohol may be added initially and the remainder may be added after the methylol melamine has formed. In view of the fact that in the step (A) reaction, the proportion of formaldehyde, alcohol and water is very critical, the latter course is greatly preferred. The total amount of alcohol employed of course depends on the degree of methylation desired.

The amount of melamine employed in the reaction should be such that the molar ratio of melamine to formaldehyde will be within the range of 1:1.5 to 1:6, respectively, although the preferred range is from 1:2.5 to 1:4, respectively.

The etherifying alcohol is preferably an alkanol having either 1 or 2 carbon atoms, i. e., methanol or ethanol. Alkanols of more than 2 carbon atoms result in products of limited water solubility.

In order to illustrate this invention more fully, the following examples are given in which all parts are parts by weight. These examples are set forth for the purpose of illustration only, and any specific enumeration of detail should not be interpreted as a limitation on the case except as indicated in the appended claims.

*Example 1*

653 parts of paraformaldehyde (containing 91% formaldehyde and 9% water) are dissolved in 390 parts of methanol and 131 parts of water, containing about 1.1 parts of 50% triethanolamine and about 1.2 parts of 20% sodium hydroxide solution, by warming and stirring. The pH of the resulting solution is 9.7. It is adjusted to 8.1 with formic acid. 756 parts of melamine (6 mols) are then added. The mixture is heated to reflux in about 10 minutes and refluxed (76–79° C.) for 40 minutes. A pasty solution is formed with a pH about 8.8. 2090 parts of methanol are then added, followed by 6.4 parts of oxalic acid crystals. The reaction mass is again heated to reflux and refluxed (68–72° C.) for 45 minutes. During the reaction, the mixture gradually clears up. At the end of the reaction, the product is slightly cooled and neutralized with about 21 parts of 20% sodium hydroxide to bring the pH to 10.2. It is filtered with a filter aid (e. g. Supercel), and the filtrate vacuum-concentrated at temperatures below 45° C. to a Gardner-Holdt viscosity at 25° of Z–1 to Z–2. The product which amounts to 1723 parts is cut back to a viscosity of X–Y with 49 parts of water. The resin is clear, and completely soluble in water.

Upon analysis, it is found that the solids content of the syrup is 82.5%, the molar ratio of combined formaldehyde to melamine is 3.2 and degree of methylation (i. e. molar ratio of combined methanol to combined formaldehyde) is 66.5%. The yield is 96% of theoretical.

*Example 2*

A solution is prepared by mixing 568 parts of paraformaldehyde (containing 91% formaldehyde and 9% water), 210 parts of formalin (containing 37% formaldehyde, 7% methanol), 400 parts of methanol, and about 2.4 parts of 20% sodium hydroxide. The pH of the solution is 10.4, and is adjusted to 7.9 with formic acid. 756 parts of melamine (6 mols) are added. The mixture is heated to reflux and refluxed for 50 minutes. After slight cooling, 2065 parts of methanol are added, followed by 6.4 parts of oxalic acid crystals. The mixture is heated to reflux and refluxed for 45 minutes. The product is neutralized, filtered, vacuum-concentrated and re-diluted as described in Example 1. The degree of methylation of the product is 73.3% and the yield amounts to 98.0% of theoretical. Product completely soluble in water.

*Example 3*

198 parts of 91% paraformaldehyde (9% water), 25 parts of water, 825 parts of methanol and 1.2 parts of 20% sodium hydroxide are warmed and stirred until paraformaldehyde is completely dissolved. The pH of the solution is 10.4. 252 parts of melamine are added. The mixture is heated to reflux and refluxed for 2¼ hours, during which period 200 parts of water are gradually introduced. 2.4 parts of oxalic acid (hydrate) are added, and the reaction mass refluxed for 35 minutes. It is then adjusted to a pH of 10.4 with about 8.5 parts of 20% sodium hydroxide, filtered and vacuum-concentrated to a viscosity of Y—on the Gardner-Holdt scale at 25° C. Yield 568 parts, or about 98% of theoretical. Degree of methylation about 53%. Product completely soluble in water.

*Example 4*

A solution is made with 205 parts of 91% paraformaldehyde (9% water), 425 parts of methanol, 100 parts of water and about 1 part of 20% sodium hydroxide. Its pH is 10.6. 252 parts of melamine are added. The mixture is heated to reflux and refluxed for 20 minutes. After slight cooling, 400 parts of methanol and 2.4 parts of oxalic acid crystals are added and the mixture is again refluxed for 35 minutes. It is neutralized, filtered, vacuum-concentrated to a Gardner-Holdt viscosity at 25° C. of Z–5. It amounts to 536 parts and is cut back to a viscosity of X–Y with 40 parts of water. Solids content of resulting syrup is 81.2%. Yield amounts to 96.5% theoretical. Degree of methylation about 56%. Product completely soluble in water.

*Example 5*

A solution is prepared with 551 parts of 91% paraformaldehyde (9% water), 250 parts of 37% formalin (containing 7% methanol), 400 parts of methanol, and 4.5 parts of 20% sodium hydroxide. Its pH is 10.5. 756 parts of melamine are added. The mixture is heated to reflux (74–75° C.) in 15 minutes and refluxed for 15 minutes. After slight cooling, 2062 parts of methanol and 7.2 parts of oxalic acid crystals are added. The mixture is brought to reflux again and further refluxed with about 21 parts of 20% sodium hydroxide, filtered, and the filtrate vacuum-concentrated to a Gardner-Holdt viscosity at 25° C. of X. The yield is 1790 parts, with a solids content of 81.7%, about 97% theoretical. Degree of methylation is 61.1%. The product is clear, completely soluble in water.

*Example 6*

998 parts of methyl Formcel (from Celanese Chemical Corporation, analyzed 54.9% formaldehyde, 29.6% methanol and by difference 15.5% water), 123.2 parts of 37% formalin (containing 7% methanol), 56 parts of methanol, and about 3.5 parts of 30% sodium hydroxide are mixed together. The pH of the solution is 10.0. 756 parts melamine are added. The mixture is brought to reflux in about 15 minutes and refluxed (77–80° C.) for 30 minutes. After slight cooling, 2065 parts of methanol and 6.4 parts of oxalic acid crystals are added, and the mixture is again heated to reflux in about 10 minutes and refluxed (68–71° C.) for 45 minutes. The product is slightly cooled, neutralized to a pH of 10.2 with about 12 parts of 30% sodium hydroxide, filtered with Supercel and the filtrate vacuum-concentrated below 50° C. to Gardner-Holdt viscosity at 25° C. of Z1. It amounts to 1727 parts and is cut back to a viscosity of X–Y with 42 parts of water. Solids content of the finished syrup is 81.2%. Yield about 96.7%. Degree of methylation 63.6%. Product completely soluble in water.

Other modifications of the process of this invention will be apparent to those skilled in the art. For example, instead of formaldehyde there may be used compounds engendering formaldehyde such as paraformaldehyde, hexamethylenetetramine and the like as is illustrated in some of the preceding examples.

I claim:

1. A process for preparing water-soluble alkylated methylol melamine condensation products comprising reacting melamine and formaldehyde in a mixture of water and an aliphatic alcohol selected from the group consisting of methanol and ethanol, at a temperature between 50° C. and reflux at a pH between 7 and 12, wherein the mol ratio of said free alcohol to free water is between about 5:1 and 0.5:1, respectively, the mol ratios of said free alcohol to formaldehyde is between about 0.4:1 to 5:1, respectively, the mol ratio of melamine to formaldehyde is within the range of about 1:1.5 to 1:6, respectively, thereafter adding thereto additional aliphatic alcohol of the class selected to the sphere of reaction in an amount sufficient to bring the mol ratio of the total alcohol charged to the total water charged to at least about 2:1, respectively, heat reacting said mixture so as to effect substantially complete alkylation under acid conditions, and neutralizing the resultant syrup.

2. A process for preparing water-soluble alkylated methylol melamine condensation products comprising reacting melamine and formaldehyde in a mixture of water and an aliphatic alcohol selected from the group consisting of methanol and ethanol, at a temperature between 50° C. and reflux at a pH between 7.5 and 10.5, wherein the mol ratio of said alcohol to water is between about 2:1 and 1:1, respectively, the mol ratio of said alcohol to formaldehyde is between 0.5:1–1:1, respectively, the mol ratio of melamine to formaldehyde is within the range of about 1:2.5–1:4, respectively, thereafter adding additional aliphatic alcohol of the class selected to the sphere of reaction in an amount sufficient to bring the mol ratio of the total alcohol charged to the total water charged to at least about 2:1, respectively, and the mol ratio of said alcohol to formaldehyde to about 5:1, respectively, heat reacting said mixture so as to effect substantially complete alkylation under acid conditions, and neutralizing the resultant syrup.

3. The process according to claim 1 in which the alcohol is methanol.

4. The process according to claim 1 in which the alcohol is ethanol.

5. The process according to claim 2 in which the alcohol is methanol.

6. The process according to claim 2 in which the alcohol is ethanol.

References Cited in the file of this patent

UNITED STATES PATENTS 2,603,623    Bonzagni _____ July 15, 1952